W. COMBE.

Gas Purifier.

No. 1,389. Reissued Jan. 27, 1863.

Witnesses:

Alex H. Hook

Julius Hemine.

Inventor:

Wm. Combe

AM. PHOTO-LITHO. CO. N.Y. (OSBORNE'S PROCESS.)

UNITED STATES PATENT OFFICE.

N. O. HAWXHURST, OF MANAT HILL, NEW YORK, ASSIGNEE OF WILLIAM COMBE, OF NEW YORK, N. Y.

IMPROVEMENT IN WOODEN SIEVES FOR GAS-PURIFIERS.

Specification forming part of Letters Patent No. 36,752, dated October 21, 1862; Reissue No. 1,389, dated January 27, 1863.

*To all whom it may concern:*

Be it known that WILLIAM COMBE, of the city, county, and State of New York, did make application for Letters Patent of the United States for certain new and useful Improvements in Wooden Sieves for Gas-Purifiers, on which Letters Patent were granted to N. O. HAWXHURST, his assignee, dated the 21st day of October, 1862, but, owing to a defect inadvertently occurring in the claim contained in said patent, it is now desired to reissue the same upon the following amended specification, which I believe fully sets forth said invention, referring to the accompanying drawings, in which—

Figure 1:
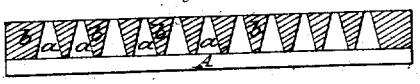
Figure 3:
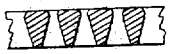
Figure 2:
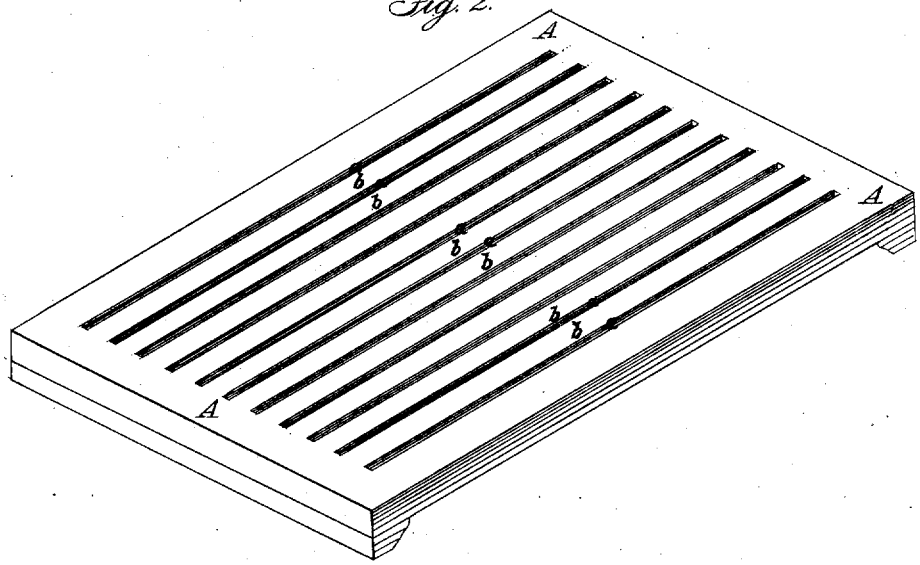

Figure 1 is a transverse section of the grating. Fig. 2 is a plan of the same in isometrical projection. Fig. 3 is a sectional view showing a modification in which the upper surface of each bar is convexed.

Heretofore those gratings which have been employed in what is technically called "dry-lime purifiers"—that is, where the lime slightly damp but in a solid state—have been composed of perforated metallic plates, which, being thin, presented so small a surface on the side of the apertures as to prevent the packing of the lime therein, by which they were kept at all times open for the free admission of the gas into the lime above them, but there were many difficulties attendant on the use of the metallic sieves or gratings and the use of wood as a substitute therefor was attempted. In order to sustain the lime and prevent their warping, the wooden gratings were required to be of considerable thickness, say an inch, more or less, according to the size of the purifier. The openings between the bars must be very small. When properly made, they should not be more than three-sixteenths of an inch for the best effect. In practice it was found that these narrow openings became choked or filled with the fine lime, and the work required to clear them prevented their coming into use. These difficulties caused him to devise the present bar-grating, which succeeds perfectly, giving a free ingress for the gas with a clear opening, while in changing the lime there is no trouble in freeing the grating any more than with the previous metal grating.

The mode which he had devised for making a cheap and efficient grating of wood is to form it out of one or more pieces of board of suitable length, the gratings being cut out of the solid by channeling, which he proposed to do by an ordinary and known means, which need not be here specifically described.

The improved grate-bars formed in this way are made broad on their upper surface and chamfered off so as to flare or form a wider space between them below, as clearly shown in the drawings, Figs. 1 and 3. This construction at once frees the bars from the lodgment of loose lime and gives an open and free passage for the gas. The grating thus formed is battoned at the ends, as shown in the drawings, and requires less fastening, is less liable to displacement, and will last longer than if made of single bars united.

By these improvements he had been enabled to successfully introduce wooden trays, gratings, or sieves practically into gas-works in the dry-lime purifiers.

The upper surface of the bars may be level, as in Fig. 1, or convexed in their cross-section, as in Fig. 3.

Having thus fully described said improvement, what is claimed as new, and for which it is desired Letters Patent, is—

A wooden grating made with apertures between the bars thereof expanding downward in lime-purifiers of gas works, constructed substantially as and for the purposes set forth.

NATHANIEL O. HAWXHURST.

Witnesses:
JACKSON MOTT,
CHAS. S. POWELL,